(12) United States Patent
Meysenc et al.

(10) Patent No.: US 7,558,087 B2
(45) Date of Patent: Jul. 7, 2009

(54) MULTILEVEL AC/DC CONVERTER FOR TRACTION APPLICATIONS

(75) Inventors: Luc Meysenc, Saint Egreve (FR); Philippe Stefanutti, Choisy (FR); Philippe Noisette, Sergy (FR); Nicolas Hugo, Geneva (CH); Alper Akdag, Umiken (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 12/068,101

(22) Filed: Feb. 1, 2008

(65) Prior Publication Data

US 2008/0198637 A1    Aug. 21, 2008

Related U.S. Application Data

(63) Continuation of application No. PCT/CH2006/000396, filed on Jul. 31, 2006.

(30) Foreign Application Priority Data

Aug. 3, 2005  (EP) .................................. 05405462

(51) Int. Cl.
*H02J 3/36* (2006.01)
*H02M 7/08* (2006.01)
(52) U.S. Cl. .......................................... 363/35; 363/69
(58) Field of Classification Search ................... 363/35, 363/53, 127, 69
See application file for complete search history.

(56) References Cited

U.S. PATENT DOCUMENTS 5,504,667 A * 4/1996 Tanaka et al. .................. 363/37

FOREIGN PATENT DOCUMENTS

DE        2614445        10/1977
EP        1 226 994 B1   7/2002

OTHER PUBLICATIONS

PCT/ISA/210, PCT/ISA/237, PCT/IPEA 416 and PCT/IPEA/409.
Staffan Norrga, "An Experimental Study of a Soft-switched isolated AC/DC Converter without Auxiliary Circuit", 35th Annual IEEE Power Electronics Specialists Conference, Aachen, Germany, 2004, pp. 2406-2412.
EPO Search Report dated Feb. 28, 2006.
High-Frequency Link DC/AC Converter with Suppressed Voltage Clamp Circuits-Naturally Commutated Phase Angle Control with Self Turn-Off Device, Mikihiko Matsui et al. p. 293-, Member, IEEE.
Design Consideration for a Medium Frequency Transformer in a Line Side Power Conversion System, Tommy Kjellqvist et al.
Configurable Front-End Converters for Multicurrent Locomotives Operated on 16 2/3 Hz AC and 3 kV DC Systems, Alfred Fufer, Senior Member, IEEE, Nakolaus Schibli, Christophe Chabert, and Claudio Zimmermann.

* cited by examiner

*Primary Examiner*—Shawn Riley
(74) *Attorney, Agent, or Firm*—Buchanan Ingersoll & Rooney PC

(57) ABSTRACT

A power supply system for railway traction applications including a multilevel AC/DC converter. The converter comprises a plurality of series-connected single-stage cycloconverters or direct AC frequency converters connected between an AC supply line and a traction transformer. The transformer is operable at a transformer nominal frequency below 3 kHz and above the AC line frequency. On the secondary side of the transformer, more than one parallel-connected secondary converter are provided and connected to a DC link. In case of failure of one of the secondary converters, the multilevel AC/DC converter may continue to operate with reduced power delivered by the remaining operating levels.

9 Claims, 1 Drawing Sheet

MULTILEVEL AC/DC CONVERTER FOR TRACTION APPLICATIONS

RELATED APPLICATIONS

This application claims priority under 35 U.S.C. §119 to EP Application 05405462.2 filed in Europe on Aug. 3, 2005, and as a continuation application under 35 U.S.C. §120 to PCT/CH2006/000396 filed as an International Application on Jul. 31, 2006 designating the U.S., the entire contents of which are hereby incorporated by reference in their entireties.

TECHNICAL FIELD

The disclosure relates to the field of electric railway power supply systems. It departs from a multilevel AC/DC converter for converting a single-phase, line-frequency AC supply voltage of an AC supply line to a DC link voltage of a DC link in railway traction applications.

BACKGROUND INFORMATION

Electric railway vehicles such as locomotives or rail coaches powered by an alternating-current (AC) supply line use a traction transformer and an AC/DC converter for converting the high voltage (15 kV or 25 kV) of the supply line to a direct-current (DC) link voltage of a few kV and to ensure a galvanic isolation between the high voltage and the traction circuits. A DC link or bus at the DC link voltage feeds the drive or motor converters for traction or propulsion of the vehicle, as well as auxiliary converters for auxiliary energy supply. Hereby, the DC link voltage does not exceed the rating of the semiconductor devices in the motor or auxiliary converters. In modern railway vehicle concepts, the traction transformer is usually placed outside the main casing of the vehicle, i.e. under floor or on the rooftop. Under these circumstances however, a conventional transformer with a nominal frequency of 16.7 Hz or 50 Hz causes integration problems due to its high weight and large volume.

Alternative power supply systems therefore aim at replacing the aforementioned conventional transformer by additional converters based on semiconductor technology in combination with a smaller and lighter transformer operating at a higher frequency. At the expense of switching losses in the semiconductor devices, the mass and volume of the transformer as well as the total, i.e. copper and magnetic, losses in the transformer can thus be reduced, resulting in a more efficient use of the electrical power from the supply line.

In the patent application EP-A 1 226 994, a medium frequency power supply system for rail vehicles is presented, including a classical converter topology for the bidirectional conversion of a high input AC voltage to a DC output voltage. The system comprises a primary converter composed of at least three cascaded converter modules or sections electrically connected in series, one single common transformer and a single secondary converter. Each cascade module in turn is formed by a four-quadrant converter, a 3.6 kV DC intermediate stage and a resonant converter. The latter comprises a half bridge with two circuit elements each having a transistor and a free-wheeling diode, as well as a series resonance capacitor. Together with the corresponding primary leakage inductance coil of the transformer, the series resonance capacitor forms an oscillating circuit having a resonance frequency higher than the transformer nominal frequency.

The secondary or output converter is a resonant switched four-quadrant converter feeding the vehicle's 1.65 kV DC link. All switching elements are advanced 6.5 kV Insulated Gate Bipolar Transistors (IGBT) with an adapted gate driver technology. The medium-frequency (MF) transformer has a ferrite core and a nominal frequency of 5 kHz, which is considered to be the optimum compromise between the volume and weight of the transformer and the switching losses of the semiconductor switches. The provision of only one transformer and only one secondary converter is expected to save not only costs but also weight, but obviously impairs the availability of the power supply system.

Instead of passing through a DC intermediate energy storage stage, conversion from one frequency to another can be achieved directly from an AC input to an AC output by a direct AC frequency converter, also known as a cycloconverter. By way of example, DE 2614445 discloses a rectifier converting low frequency AC voltage into DC voltage via a transformer operating at medium/high frequencies that comprises, on the AC side of the transformer, an externally controlled, single-phase bridge cycloconverter. The latter comprises a single conversion stage between the low frequency of the supply line and the medium/high frequency of the transformer, and thus presents fewer power conversion stages and no crowbar circuit as compared to the abovementioned cascade modules including an intermediate DC stage. Furthermore, the cycloconverter operates with natural commutations. On the other hand, a voltage source converter (VSC) on the DC side of the transformer operates with hard switching off, resulting in comparatively high stresses on the semiconductor devices of the current valves and high switching losses.

In the article by Staffan Norrga, "*An Experimental Study of a Soft-switched Isolated AC/DC Converter without Auxiliary Circuit*", 35th Annual IEEE Power Electronics Specialists Conference, Aachen, Germany, 2004, pages 2406-2412, a single-level, single-phase AC/DC converter for bidirectional power flow is presented. The converter topology incorporates a single-phase cycloconverter coupled by a medium frequency (MF) transformer to a voltage source converter (VSC). The VSC has so-called snubber capacitors connected in parallel to each of the semiconductor valves, providing a sufficient capacity to allow for zero-voltage turn-off of said valves and reducing the voltage derivatives when the valves are switched. On the other hand, the VSC has no additional or auxiliary semiconductor devices that do not take part in the power conversion itself and merely add to the costs and complexity of the converter. Following the commutation algorithm proposed, this topology allows to obtain soft switching of the semiconductor valves in the VSC-converter in all points of operation. A prototype converter system has been realised with a DC link voltage of 600 V and a ferrite core toroidal MF transformer operating at 6 kHz. The bidirectional valves of the cycloconverter are made up of two single, individually controlled, standard 1200 V IGBT switches in common-emitter connection.

The article "*High-Frequency Link DC/AC Converter with Suppressed Voltage Clamp Circuits—Naturally Commutated Phase Angle Control with Self Turn-Off Devices*" by Mikihiko Matsui et al., IEEE Trans. Ind. Appl., Vol. 32, No. 2, 1996, pages 293-300, proposes an alternative control for a cycloconverter-type, three-phase output, high frequency (HF) link DC/AC converter for e.g. uninterruptible power supply (UPS) systems. The converter has two power conversion stages, i.e. the inverter stage for DC to HF (16 kHz) and the cycloconverter stage for HF to the low or commercial frequency of the AC power line. Because of the use of self turn-off devices (bidirectional transistors and fast recovery diodes), the proposed control approach requires modified control pulse timing and adopts only phase angle control based on natural commutation for the cycloconverter stage. As the magnetic energy stored in the leakage inductances of the HF transformer at the moment of switching is released and feedback to the DC voltage source, there is no need for additional surge suppressing circuits (snubber circuit or active voltage lamp circuit) on the cycloconverter side of the transformer for absorbing said magnetic energy.

SUMMARY

The availability of the aforementioned power supply system for railway traction applications can be increased without unduly increasing its weight based on a multilevel AC/DC converter with frequency conversion and/or a method of converting an AC supply voltage to a DC link voltage.

A multilevel AC/DC converter for converting a single-phase, line-frequency AC supply voltage of an AC supply line to a DC link voltage ($U_{DC}$) of a DC link in railway traction applications is disclosed, comprising a traction transformer for establishing a galvanic isolation between the AC supply line and the DC link, wherein the traction transformer is operable at a transformer nominal frequency ($f_{TR}$) above the AC line frequency, multiple primary converters connectable to the AC supply line, wherein inputs of the primary converters are connected in series and wherein an output of each primary converter is connected to a primary winding of the traction transformer, and at least two secondary converters, a secondary converter being connectable to the DC link, wherein an input of the respective secondary converter is connected to a respective secondary winding of the traction transformer, wherein outputs of the at least two secondary converters are connected in parallel, and wherein the primary converters are cycloconverters.

A method of converting a single-phase, line-frequency AC supply voltage of an AC supply line to a DC link voltage ($U_{DC}$) of a DC link in railway traction applications by means of a multilevel AC/DC converter is disclosed, comprising, establishing a galvanic isolation between the AC supply line and the DC link by means of a traction transformer operable at a transformer nominal frequency ($f_{TR}$) above the AC line frequency, connecting multiple primary converters to the AC supply line, wherein inputs of the primary converters are connected in series and wherein an output of each primary converter is connected to a primary winding of the traction transformer, connecting a secondary converter to the DC link, wherein an input of the secondary converter is connected to a secondary winding of the traction transformer, wherein outputs of at least two secondary converters are connected in parallel, wherein the primary converters are cycloconverters.

BRIEF DESCRIPTION OF THE DRAWINGS

The subject matter of the disclosure will be explained in more detail in the following text with reference to exemplary embodiments which are illustrated in the attached drawings, in which.

Figure 1:
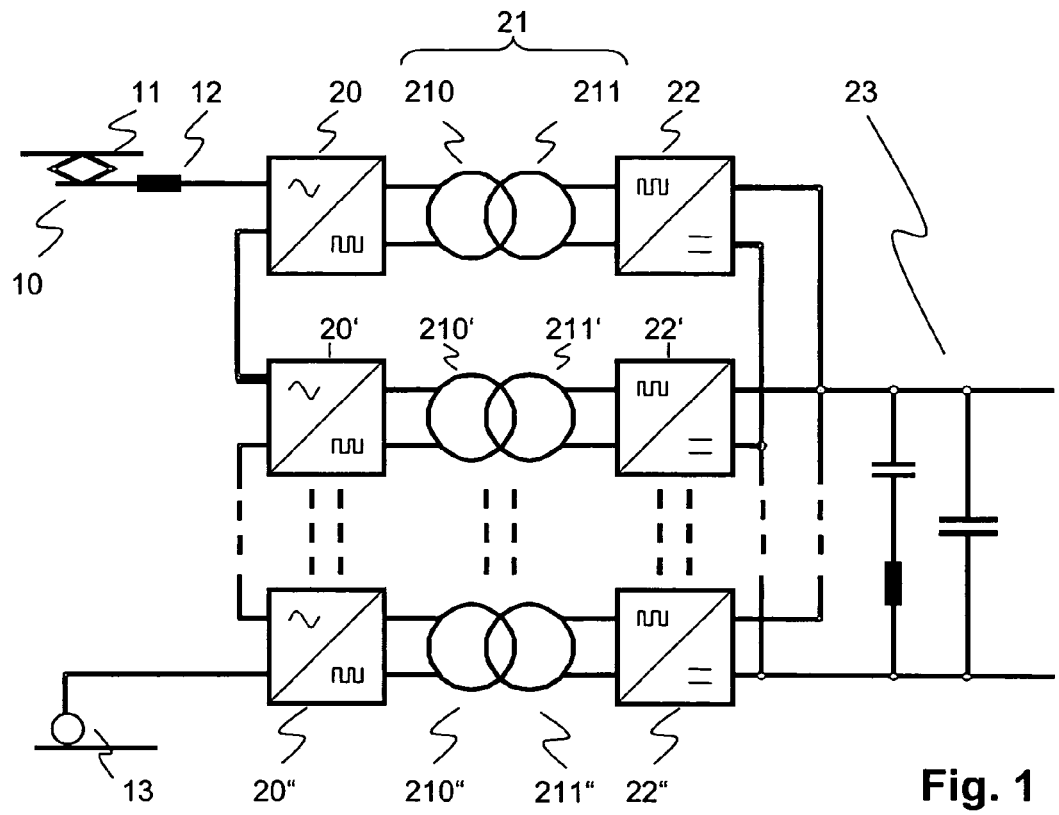
FIG. 1 schematically depicts an exemplary multilevel converter topology.

The reference symbols used in the drawings, and their meanings, are listed in summary form in the list of reference symbols. In principle

DETAILED DESCRIPTION

According to the disclosure, in an exemplary power supply system with a multilevel AC/DC converter comprising a plurality of series-connected primary converters connectable to an AC supply line and a traction transformer operable at a transformer nominal frequency above an AC line frequency, more than one parallel-connected secondary converter connectable to a DC link are provided. In case of failure of one of the secondary converters, the multilevel AC/DC converter may thus continue to operate with reduced power delivered by the remaining secondary converters. In order to compensate for the increase in weight on the secondary side, single-stage cycloconverters or direct AC frequency converters are used as primary converters. The reduced number of power conversion stages and/or components of the cycloconverter as compared to a classical converter topology including an intermediate DC stage furthermore reduce the complexity of the control sequences as well as the overall weight, volume and losses of the converter.

In another exemplary embodiment of the disclosure, the nominal transformer frequency of the traction transformer is chosen to be below 3 kHz and preferably less than 1 kHz, which allows to use known low frequency transformer technology including sheathed iron cores instead of ferrite cores as used in medium/high frequency transformers. In other words, the proven and cheap transformer technology shifts the optimum balance between increasing magnetic or hysteretic losses in the transformer core and decreasing volume to lower transformer frequencies.

In an exemplary embodiment of the disclosure, the secondary converters are deprived of additional snubber capacitors arranged in parallel to the semiconductor switches. Accordingly, hard switching off takes place when opening the semiconductor switches of the secondary converters. A number of components can thus be saved, the secondary converters becoming less sophisticated and more robust.

In an exemplary embodiment, a plurality of secondary converters equal in number to the primary converters is provided. Each converter level of the multilevel AC/DC converter thus comprises a primary converter and a dedicated secondary converter that are connected to concentrical primary and secondary windings of the traction transformer.

FIG. 1 depicts an exemplary embodiment of multilevel converter topology according to the disclosure. A pantograph frame of a current collector 10 is in contact with an overhead supply line 11 of a railway catenary system. The current collector is connected, via a line impedance filter 12, to a first primary converter 20. The latter is connected in series with a second primary converter 20' and further primary converters, wherein the last primary converter 20" is connected, via a wheel 13, to a rail. Each primary converter 20, 20', 20" is further connected to a primary winding 210, 210', 210" of a traction transformer 21. Secondary windings 211, 211', 211" of the traction transformer 21 are connected to secondary converters 22, 22', 22". Each primary converter 20, 20', 20" and the corresponding transformer windings 210, 211; 210', 211'; 210", 211" and secondary converter 22, 22', 22" form a single AC/DC converter level. All secondary converters 22, 22', 22" are electrically connected in parallel with each other and with a DC link 23.

Figure 2:
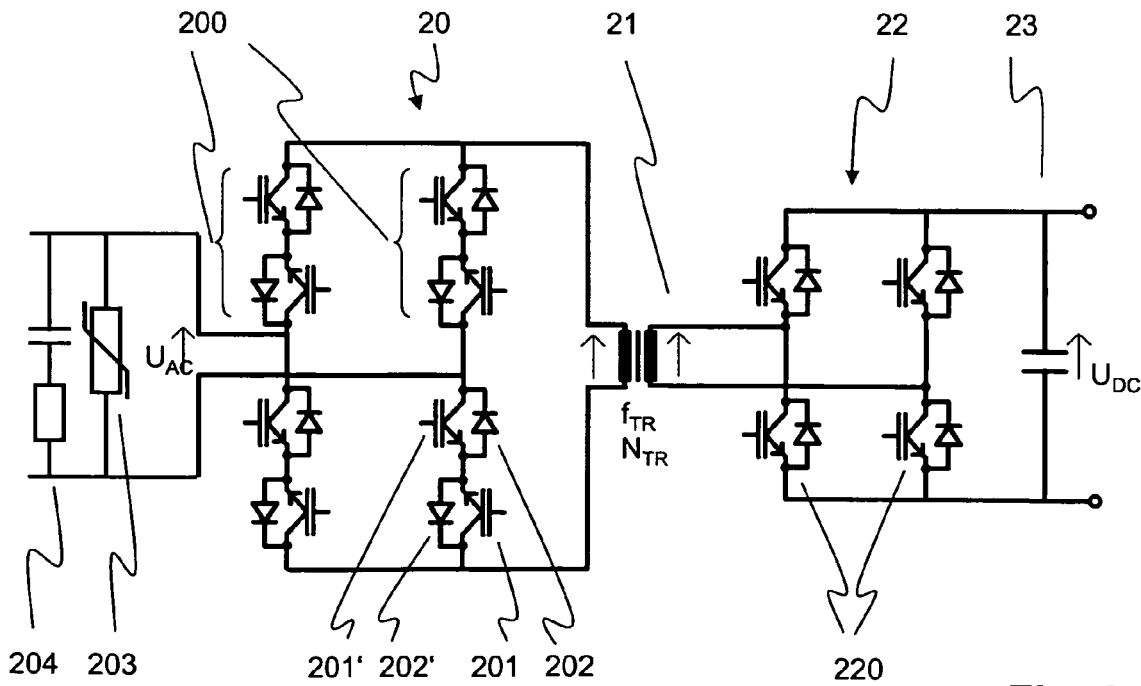
FIG. 2 schematically shows details of an exemplary single AC/DC converter level.

FIG. 2 shows the details of an exemplary single AC/DC converter level. The primary converter 20 is a single-phase cycloconverter with four bidirectional semiconductor valves 200 arranged in an H-bridge. Each valve 200 consists of two anti-parallel arranged synthetic thyristors composed each of an insulated gate bipolar transistor (IGBT) 201, 201' and a diode 202, 202' connected in series, wherein the emitter of one IGBT 201 and the emitter of the other IGBT 201' are connected together. Obviously, the bidirectional valve could be realised with other power semiconductor elements, such as a fast bipolar controlled thyristor (BCT) or an integrated gate commutated transistor (IGCT). Over-voltage protection of the components of the cycloconverter is generally achieved by adding non-linear components such as varistor 203 in parallel to the input of each converter level. Likewise, a protective snubber circuit such as resistor-capacitor circuit 204 in parallel to the input of each converter level prevents the voltage from rising too rapidly across the power semiconductor devices. Furthermore, means for active voltage clamping on each IGBT gate driver of the cycloconverter may be provided (not depicted in FIG. 2).

The transformer 21 insures galvanic insulation between the supply line voltage and the DC link. In operation, the primary converter 20 converts a fraction $U_{AC}$ of the supply line AC voltage to a square wave voltage at a nominal transformer frequency $f_{TR}$ that is fed to the transformer. The transformer can be made of conventional material used in low frequency traction transformers, i.e. conventional magnetic sheets are stacked to build the transformer core. The core and the windings are immersed in a cooling and/or insulating liquid contained in a containment vessel that in turn may be attached underneath the floor or on the rooftop of the vehicle casing. Due to the conventional transformer design, the nominal transformer frequency $f_{TR}$ is below 3 kHz and preferably around 400 Hz, and thus distinctly higher than the AC line frequency.

The transformer ratio $N_{TR}$ may be equal to one, such that the DC link voltage $U_{DC}$ is approximately equal to the effective value of the voltage $U_{AC}$ applied to a single converter level. On the other hand, if e.g. in order to reduce the number of levels the primary converter 20 uses semiconductor devices with a higher voltage rating than the semiconductor devices used in the secondary converter 22, a transformer ratio $N_{TR}$ above one, and preferably below five, adjusts the voltage $U_{AC}$ to the DC link voltage $U_{DC}$.

The secondary converter 22 is a voltage source converter and comprises a conventional H-Bridge with two phase-legs and four unidirectional valves 220 allowing 4-quadrant operation. The valves 220 consist of an IGBT and a freewheeling diode connected in anti-parallel. In order to reduce the number of components, the IGBTs are hard switched off, i.e. no snubber capacitors are provided in parallel to the IGBTs for enabling soft commutation. Preferable control schemes for this purpose, which reduce the voltage spikes across the semiconductor devices by suitably releasing the magnetic energy stored in the leakage inductances of the transformer, are known e.g. from the article by Mikihiko Matsui et al cited above.

The number of converter levels to be used in a traction vehicle depends on the AC line voltage. For instance, for a line voltage of 15 kV, a total of 16 levels provide a sufficient security margin for the single-level voltage $U_{AC}$ to which the semiconductor devices in the individual levels are exposed. In case of failure of one of the 16 levels, the remaining 15 levels thus allow the AC/DC converter to continue operation at about 15/16 of the original power. An extension to a line voltage of 25 kV is feasible, although adaptations to the converter topology may be necessary to avoid insulation problems at the peak line voltages beyond 30 kV. Likewise, DC supply voltages of e.g. 3 kV may be achieved.

The foregoing specification has been based on a power flow from the AC supply line to the DC link. However, the AC/DC converter is able to handle power flow in both directions, thus the notion of primary/secondary converters or windings is not to be seen as absolute. Finally, the transformer windings 210, 211; 210', 211'; 210", 211" of the different converter levels can be arranged on a common core, on different but magnetically coupled core sections, or on individual, magnetically decoupled cores.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS 10 current collector
11 supply line
12 line filter
13 wheel
20, 20', 20" primary converter
21 traction transformer
210, 210', 210" primary winding
211, 211', 211" secondary winding
22. 22', 22" secondary converter
23 DC link
200 bidirectional valve
201, 201' IGBT
202, 202' diode
203 varistor
204 protective snubber circuit
220 unidirectional valve

What is claimed is:

1. A multilevel AC/DC converter for converting a single-phase, line-frequency AC supply voltage of an AC supply line to a DC link voltage ($U_{DC}$) of a DC link in railway traction applications, comprising
  a traction transformer for establishing a galvanic isolation between the AC supply line and the DC link, wherein the traction transformer is operable at a transformer nominal frequency ($f_{TR}$) above the AC line frequency,
  multiple primary converters connectable to the AC supply line, wherein inputs of the primary converters are connected in series and wherein an output of each primary converter is connected to a primary winding of the traction transformer, and
  at least two secondary converters, a secondary converter being connectable to the DC link, wherein an input of the respective secondary converter is connected to a respective secondary winding of the traction transformer,
  wherein outputs of the at least two secondary converters are connected in parallel, wherein the primary converters are cycloconverters, and wherein the nominal frequency of the traction transformer($f_{TR}$) is less than 3 kHz.

2. The converter according to claim 1, wherein the nominal frequency of the traction transformer ($f_{TR}$) is less than 1 kHz.

3. The converter according to claim 1, wherein no snubber capacitors are connected in parallel to the semiconductor switches of the at least two secondary converters.

4. The converter according to claim 1, wherein a secondary winding of the traction transformer is arranged concentrically to each primary winding of the traction transformer and connected to an input of a dedicated one of the at least two secondary converters.

5. The converter according to claim 4, wherein each primary winding and the concentrically arranged secondary winding of the traction transformer have at least approximately the same number of turns.

6. The converter according to claim 1, wherein means for over-voltage protection and/or means for voltage-rise protection of each primary converter are arranged between the inputs of the primary converter.

7. A method of converting a single-phase, line-frequency AC supply voltage of an AC supply line to a DC link voltage ($U_{DC}$) of a DC link in railway traction applications by means of a multilevel AC/DC converter, comprising, establishing a galvanic isolation between the AC supply line and the DC link by means of a traction transformer operable at a transformer nominal frequency ($f_{TR}$) above the AC line frequency, connecting multiple primary converters to the AC supply line, wherein inputs of the primary converters are connected in series and wherein an output of each primary converter is connected to a primary winding of the traction transformer, connecting a secondary converter to the DC link, wherein an input of the secondary converter is connected to a secondary winding of the traction transformer, wherein outputs of at least two secondary converters are connected in parallel, wherein the primary converters are cycloconverters, and wherein the traction transformer is operated at a frequency of less than 3 kHz.

8. The method according to claim 7, wherein the traction transformer is operated at a frequency of less than 1 kHz.

9. The method according to claim 7, wherein the semiconductor switches of the at least two secondary converters are operated in hard switching off and natural switching on.

* * * * *